US012124218B2

(12) United States Patent
Favre et al.

(10) Patent No.: US 12,124,218 B2
(45) Date of Patent: Oct. 22, 2024

(54) SHOCK-RESISTANT PROTECTION PROVIDED WITH A VISCOUS SUBSTANCE FOR A RESONATOR MECHANISM WITH ROTARY FLEXIBLE GUIDE

(71) Applicant: The Swatch Group Research and Development Ltd, Marin (CH)

(72) Inventors: Jérôme Favre, Neuchatel (CH); Dominique Lechot, Les Reussilles (CH); Baptiste Hinaux, Lausanne (CH); Gianni Di Domenico, Neuchâtel (CH); Pascal Winkler, St-Blaise (CH)

(73) Assignee: The Swatch Group Research and Development Ltd, Marin (CH)

( * ) Notice: Subject to any disclaimer, the term of this patent is extended or adjusted under 35 U.S.C. 154(b) by 400 days.

(21) Appl. No.: 17/526,700

(22) Filed: Nov. 15, 2021

(65) Prior Publication Data

US 2022/0187769 A1 Jun. 16, 2022

(30) Foreign Application Priority Data

Dec. 15, 2020 (EP) .................................... 20214330

(51) Int. Cl.

| | |
|---|---|
| ***G04B 17/04*** | (2006.01) |
| ***G04B 17/28*** | (2006.01) |
| ***G04B 17/32*** | (2006.01) |
| ***G04B 31/02*** | (2006.01) |
| ***G04B 43/00*** | (2006.01) |

(52) U.S. Cl.

CPC ........... *G04B 17/045* (2013.01); *G04B 17/28* (2013.01); *G04B 17/32* (2013.01); *G04B 31/02* (2013.01); *G04B 43/002* (2013.01)

(58) Field of Classification Search

CPC ...... G04B 17/045; G04B 17/28; G04B 17/32; G04B 31/02; G04B 43/002

USPC .......................................................... 368/168

See application file for complete search history.

(56) References Cited

U.S. PATENT DOCUMENTS

| | | | | |
|---|---|---|---|---|
| 2017/0123380 | A1* | 5/2017 | Winkler | G04B 15/14 |
| 2020/0150595 | A1* | 5/2020 | Winkler | G04B 17/045 |
| 2020/0319597 | A1* | 10/2020 | Musy | G04B 31/04 |

FOREIGN PATENT DOCUMENTS

| | | |
|---|---|---|
| CH | 715 526 A | 5/2020 |
| CN | 109239397 A | 1/2019 |

(Continued)

OTHER PUBLICATIONS

European Search Report for EP 20 21 4330 dated May 19, 2021.

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A timepiece resonator mechanism (100), including a structure (1) carrying, by a flexible suspension (300), an anchoring block (30) from which is suspended an inertial element (2) oscillating about a pivot axis (D) extending in a first direction Z, according to a first rotational degree of freedom RZ, under the action of return forces of a flexible pivot (200) including elastic longitudinal strips (3) each fixed to said inertial element (2) and to said anchoring block (30), the resonator mechanism including a viscous substance (10) arranged at least partly around the flexible suspension (300), the viscous substance (10) being configured to at least partly dissipate the energy due to a shock.

15 Claims, 2 Drawing Sheets

(56) References Cited

FOREIGN PATENT DOCUMENTS

| | | | |
|---|---|---|---|
| EP | 3 719 587 | A1 | 10/2020 |
| JP | 2020-76770 | A | 5/2020 |

* cited by examiner

SHOCK-RESISTANT PROTECTION PROVIDED WITH A VISCOUS SUBSTANCE FOR A RESONATOR MECHANISM WITH ROTARY FLEXIBLE GUIDE

CROSS REFERENCE TO RELATED APPLICATION

This application is Non-Provisional application, claiming priority on European Patent Application 20214330.1 filed Dec. 15, 2020.

FIELD OF THE INVENTION

The invention relates to a timepiece resonator mechanism, including a structure and an anchoring block from which is suspended at least one inertial element, a virtual pivot including a plurality of substantially longitudinal elastic strips, each fixed, at a first end to said anchoring block, and at a second end to said inertial element.

The invention also relates to a horological movement including at least one such resonator mechanism.

The invention relates to the field of timepiece resonators, and more particularly those which include elastic strips acting as return means for the operation of the oscillator.

BACKGROUND OF THE INVENTION

The torsional stiffness of the suspension is a delicate point for most watch oscillators including at least one spiral spring or elastic strips constituting a flexible guide, and in particular for crossed-strip resonators. And shock resistance also depends on this torsional stiffness; in fact, during shocks, the stress undergone by the strips quickly reaches very high values, which further reduces the travel that the part can travel before failing. Shock-absorbers for timepieces come in many variations. However, their main purpose is to protect the fragile pivots of the resonator axis, and not the elastic elements, such as conventionally the spiral spring.

New mechanism architectures allow to maximise the quality factor of a resonator, by the use of a flexible guide with the use of an anchor escapement with a very small lift angle, according to the application CH15442016 in the name of ETA Manufacture Horlogere Suisse and its derivatives, the teachings of which can be used directly in the present invention, and the resonator of which can be further improved with regard to its sensitivity to shocks, in some particular directions. It is therefore a question of protecting the strips from rupture in the event of a shock. It is clear that the shock-resistant systems proposed to date for resonators with flexible guides, protect the strips from shocks in certain directions only, but not in all directions, or that they have the defect of allowing the embedding of the virtual pivot to move slightly according to its oscillation rotation, which should be avoided as much as possible.

Application CH5182018 or application EP18168765 in the name of ETA Manufacture Horlogere Suisse describes a timepiece resonator mechanism, including a structure carrying, by a flexible suspension, an anchoring block from which is suspended an inertial element oscillating according to a first rotational degree of freedom RZ, under the action of return forces exerted by a virtual pivot including first elastic strips each fixed to said inertial element and to said anchoring block, the flexible suspension being arranged to allow a certain mobility of the anchoring block according to all the degrees of freedom other than the first rotational degree of freedom RZ according to which only the inertial element is movable to avoid any disturbance of its oscillation, and the stiffness of the suspension according to the first rotational degree of freedom RZ is very strongly higher than the stiffness of the virtual pivot according to this same first rotational degree of freedom RZ.

Application CH715526 or application EP3561607 in the name of ETA Manufacture Horlogere Suisse describes a timepiece resonator mechanism, including a structure and an anchoring block from which is suspended at least one inertial element arranged to oscillate according to a first rotational degree of freedom RZ about a pivot axis extending in a first direction Z, said inertial element being subjected to return forces exerted by a virtual pivot including a plurality of substantially longitudinal elastic strips, each fixed at a first end to said anchoring block, and at a second end to said inertial element, each said elastic strip being deformable essentially in a plane XY perpendicular to said first direction Z.

However, sometimes it is one or more strips of the flexible suspension, which break during a strong shock, or wear prematurely until it is likely to rupture after a series of small shocks. Indeed, the flexible suspension avoids the rupture of the virtual pivot, but it undergoes the shock instead.

SUMMARY OF THE INVENTION

The invention proposes to improve the resonator mechanism of application CH715526 or application EP3561607 in the name of ETA Manufacture Horlogere Suisse to protect the flexible suspension from the aforementioned disadvantages.

To this end, the invention relates to a timepiece resonator mechanism, including a structure and an anchoring block from which is suspended at least one inertial element arranged to oscillate according to a first rotational degree of freedom RZ about a pivot axis extending in a first direction Z, said inertial element being subjected to return forces exerted by a virtual pivot including a plurality of substantially longitudinal elastic strips, each fixed, at a first end to said anchoring block, and at a second end to said inertial element, each said elastic strip being deformable essentially in a plane XY perpendicular to said first direction Z, said anchoring block being suspended from said structure by a flexible suspension arranged to allow mobility of said anchoring block.

The invention is remarkable in that the resonator mechanism includes a viscous substance arranged at least partly around the flexible suspension, the viscous substance being configured to at least partly dissipate the energy due to a shock.

Thanks to the viscous substance, the flexible suspension is better protected in the event of a strong shock, in particular to prevent the flexible suspension, in particular one of the strips or rods, from breaking or cracking prematurely. Thus, a double protection is obtained, a first protection for the strips of the virtual pivot thanks to the flexible suspension, and a second protection for the flexible suspension by the viscous substance. Consequently, the invention improves the protection of the resonator mechanism against the risk of breakage.

According to a particular embodiment of the invention, said flexible suspension includes, between said anchoring block and a first intermediate mass, which is fixed to said structure directly or by means of a flexible plate in said first direction Z, a transverse translation platform with flexible guide and including at least two transverse flexible strips or rods, which are preferably rectilinear, and extending in said second direction X and in symmetry about a transverse axis crossing said pivot axis.

According to a particular embodiment of the invention, the viscous substance is arranged between the transverse flexible strips or rods of the transverse translation platform.

According to a particular embodiment of the invention, the viscous substance is arranged at least partly around the first intermediate mass.

According to a particular embodiment of the invention, the viscous substance is arranged at least partly around said anchoring block According to a particular embodiment of the invention, the viscous substance is arranged at least partly around the second intermediate mass.

According to a particular embodiment of the invention, the viscous substance comprises glue sensitive to ultraviolet radiation.

According to a particular embodiment of the invention, the viscous substance comprises rubber.

According to a particular embodiment of the invention, the viscous substance comprises silicone.

According to a particular embodiment of the invention, said flexible suspension includes, between said anchoring block and a second intermediate mass, a longitudinal translation platform with flexible guide and including at least two longitudinal flexible strips or rods, which are preferably rectilinear, and extending in said third direction Y and in symmetry about a longitudinal axis crossing said pivot axis, and includes said transverse translation platform between said second intermediate mass and said first intermediate mass.

According to a particular embodiment of the invention, the viscous substance is arranged at least partly between the longitudinal flexible strips or rods of the longitudinal translation platform.

According to a particular embodiment of the invention, the viscous substance is arranged at least partly around the second intermediate mass.

According to a particular embodiment of the invention, the flexible suspension is made in one piece.

According to a particular embodiment of the invention, the flexible suspension is made of silicon.

According to a particular embodiment of the invention, the anchoring block is movable according to five flexible degrees of freedom of the suspension which are a first translational degree of freedom along said first direction Z, a second translational degree of freedom along a second direction X orthogonal to said first direction Z, a third translational degree of freedom along a third direction Y orthogonal to said second direction X and to said first direction Z, a second rotational degree of freedom RX about an axis extending in said second direction X, and a third rotational degree of freedom RY about an axis extending in said third direction YX The invention also relates to a horological movement including at least one resonator mechanism according to the invention, and/or at least one timepiece oscillator mechanism including a timepiece resonator mechanism and an escapement mechanism, which are arranged to cooperate with each other.

BRIEF DESCRIPTION OF THE DRAWINGS

Other features and advantages of the invention will become apparent upon reading the detailed description which follows, with reference to the appended drawings, where.

DETAILED DESCRIPTION OF THE PREFERRED EMBODIMENTS

Figure 1:
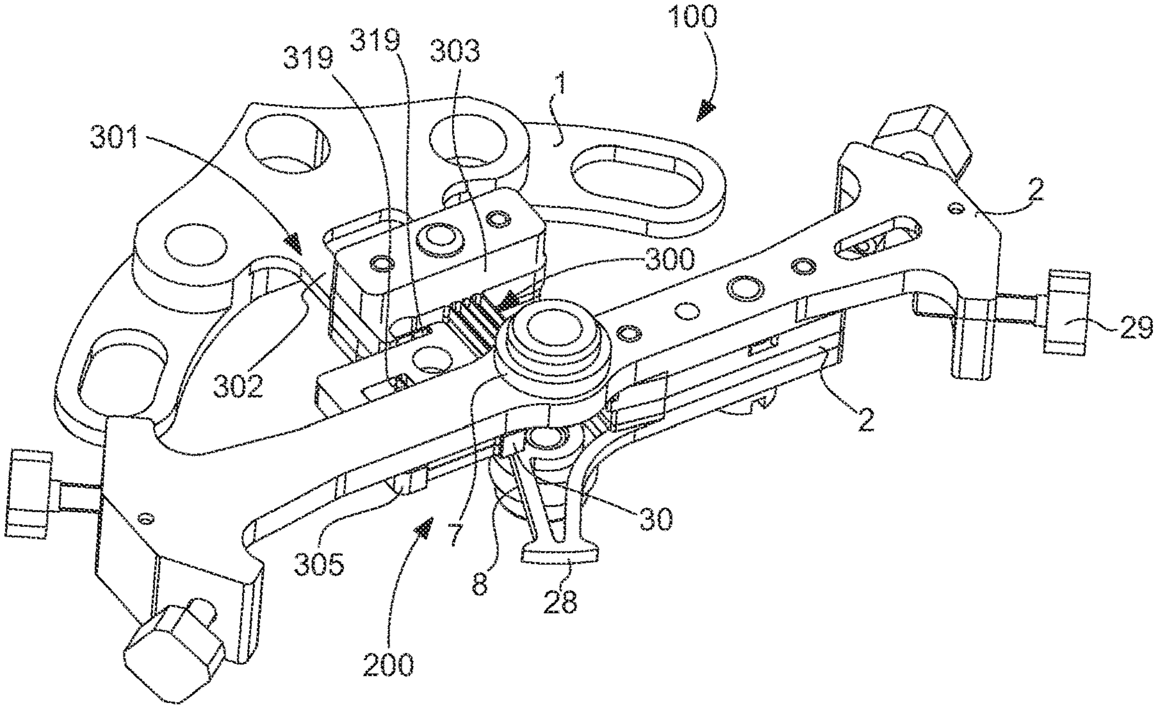
FIG. 1 shows, schematically, and in perspective, a resonator mechanism with elastic strips, including an inertial mass suspended from an anchoring block by a virtual pivot.

The invention relates to a timepiece resonator mechanism, which constitutes a variant of the resonators described in application CH5182018 or application EP18168765 in the name of ETA Manufacture Horlogere Suisse, incorporated here by reference, and the person skilled in the art will be able to combine the features of which with those specific to the present invention. Represented in FIGS. 1 to 4, this timepiece resonator mechanism 100 includes a structure 1 and an anchoring block 30, from which is suspended at least one inertial element 2 arranged to oscillate according to a first rotational degree of freedom RZ about a pivot axis D extending in a first direction Z. The inertial element 2 comprises a balance 20. The balance has the shape of a bone, the balance comprising a straight segment provided with a bulb at each end. Each bulb may include small inertia-blocks 29 to adjust the inertia of the inertial element 2. This inertial element 2 is subjected to return forces exerted by a virtual pivot 200 including a plurality of substantially longitudinal elastic strips 3, each fixed, at a first end to the anchoring block 30, and at a second end to the inertial element 2. Each elastic strip 3 is deformable essentially in a plane XY perpendicular to the first direction Z.

The anchoring block 30 is suspended from the structure 1 by a flexible suspension 300, which is arranged to allow the mobility of the anchoring block 30 according to five flexible degrees of freedom of the suspension which are:

- a first translational degree of freedom along the first direction Z,
- a second translational degree of freedom along a second direction X orthogonal to the first direction Z,
- a third translational degree of freedom along a third direction Y orthogonal to the second direction X and to the first direction Z,
- a second rotational degree of freedom RX about an axis extending in the second direction X, and
- a third rotational degree of freedom RY about an axis extending in the third direction Y.

The principle is to use the torsional flexibility of a translation platform to better manage the torsional stiffness of the suspension. For this purpose, the strips of the platforms XY are oriented so that the direction of greater torsional flexibility aims at the axis of rotation of the resonator. Their torsional flexibility is managed by bringing the strips together.

Thus, the flexible suspension 300 includes, between the anchoring block 30 and a first intermediate mass 303, which is fixed to the structure 1 directly or by means of a flexible plate 301 in the first direction Z, a transverse translation platform 32 with flexible guide, and which includes transverse strips 320 or transverse flexible rods, which are rectilinear and extending in the second direction X.

In a particular non-limiting embodiment, and as illustrated by the figures, the flexible suspension 300 also includes, between the anchoring block 30 and a second intermediate mass 305, a longitudinal translation platform 31 with flexible guide, and which includes longitudinal strips 310 or longitudinal flexible rods, which are rectilinear and extending in the third direction Y. And, between the second intermediate mass 305 and the first intermediate mass 303, the transverse translation platform 32 with flexible guide includes transverse strips 320 or transverse flexible rods, which are rectilinear and extending in the second direction X.

More particularly, the longitudinal axis D1 intersects the transverse axis D2, and in particular the longitudinal axis D1, the transverse axis D2, and the pivot axis D are concurrent.

More particularly, the longitudinal translation platform 31 and the transverse translation platform 32 each include at least two flexible strips or rods, each strip or rod being characterised by its thickness in the second direction X when the strip or rod extends in the third direction Y or vice versa, by its height in the first direction Z, and by its length in the direction in which the strip or rod extends, the length being for example at least five times greater than the height, the height being at least as great as the thickness, and more particularly at least five times greater than this thickness, and more particularly still at least seven times greater than this thickness.

More particularly, the transverse translation platform 32 includes at least two transverse flexible strips or rods, mutually parallel and of the same length. FIGS. 1 to 4 illustrate a non-limiting variant with four parallel transverse strips, and, more particularly, each consisting of two half-strips arranged on two superimposed levels, and extending in the continuation of one another in the first direction Z. These half-strips can either be entirely free relative to each other, or else secured together by gluing or the like, or by growth of $SiO_2$ in the case of an embodiment of silicon, or the like. Of course, the longitudinal translation platform 31, when it exists since it is optional, can obey the same principle of construction. The number, arrangement, and section of these strips or rods, can vary without departing from the present invention.

The principle is to use the torsional flexibility of a translation platform to better manage the torsional stiffness of the suspension. For this purpose, the strips of the platforms XY are oriented so that the direction of greater torsional flexibility aims at the axis of rotation of the resonator. Their torsional flexibility is managed by bringing the strips together.

Thus, the flexible suspension 300 includes, between the anchoring block 30 and a first intermediate mass 303, which is fixed to the structure 1 directly or by means of a flexible plate 301 in the first direction Z, a transverse translation platform 32 with flexible guide, and which includes transverse strips 320 or transverse flexible rods, which are rectilinear and extending in the second direction X.

In a particular non-limiting embodiment, and as illustrated by the figures, the flexible suspension 300 also includes, between the anchoring block 30 and a second intermediate mass 305, a longitudinal translation platform 31 with flexible guide, and which includes longitudinal strips 310 or longitudinal flexible rods, which are rectilinear and extending in the third direction Y. And, between the second intermediate mass 305 and the first intermediate mass 303, the transverse translation platform 32 with flexible guide includes transverse strips 320 or transverse flexible rods, which are rectilinear and extending in the second direction X.

More particularly, the longitudinal axis D1 intersects the transverse axis D2, and in particular the longitudinal axis D1, the transverse axis D2, and the pivot axis D are concurrent.

More particularly, the longitudinal translation platform 31 and the transverse translation platform 32 each include at least two flexible strips or rods, each strip or rod being characterised by its thickness in the second direction X when the strip or rod extends in the third direction Y or vice versa, by its height in the first direction Z, and by its length in the direction in which the strip or rod extends, the length being for example at least five times greater than the height, the height being at least as great as the thickness, and more particularly at least five times greater than this thickness, and more particularly still at least seven times greater than this thickness.

More particularly, the transverse translation platform 32 includes at least two transverse flexible strips or rods, mutually parallel and of the same length. FIGS. 1 to 4 illustrate a non-limiting variant with four parallel transverse strips, and, more particularly, each consisting of two half-strips arranged on two superimposed levels, and extending in the continuation of one another in the first direction Z. These half-strips can either be entirely free relative to each other, or else secured together by gluing or the like, or by growth of $SiO_2$ in the case of an embodiment of silicon, or the like. Of course, the longitudinal translation platform 31, when it exists since it is optional, can obey the same principle of construction. The number, arrangement, and section of these strips or rods can vary without departing from the present invention. More particularly, the transverse strips or rods of the transverse translation platform 32 have a first plane of symmetry, which is parallel to the transverse axis D2, and which passes through the pivot axis D.

More particularly, the transverse strips or rods of the transverse translation platform 32 have a second plane of symmetry, which is parallel to the transverse axis D2, and orthogonal to the pivot axis D.

More particularly, the transverse strips or rods of the transverse translation platform 32 have a third plane of symmetry, which is perpendicular to the transverse axis D2, and parallel to the pivot axis D.

More particularly, the transverse strips or rods of the transverse translation platform 32 extend over at least two mutually parallel levels, each level being perpendicular to the pivot axis D.

More particularly, the arrangement of the transverse strips or rods of the transverse translation platform 32 is identical on each of the levels.

More particularly, the transverse strips or rectilinear flexible rods 320, 1320 are flat strips the height of which is at least five times greater than their thickness.

More particularly, 1 to 11, the transverse strips or rectilinear flexible rods 320 are rods of square or circular section, whose height is equal to the thickness.

More particularly, the longitudinal translation platform 31 includes at least two longitudinal flexible strips or rods, mutually parallel and of the same length.

More particularly, the longitudinal strips or rods of the longitudinal translation platform 31 have a first plane of symmetry, which is parallel to the longitudinal axis D1, and which passes through the pivot axis D.

More particularly, the longitudinal strips or rods of the longitudinal translation platform 31 have a second plane of symmetry, which is parallel to the longitudinal axis D1, and orthogonal to the pivot axis D.

More particularly, the longitudinal strips or rods of the longitudinal translation platform 31 have a third plane of symmetry, which is perpendicular to the longitudinal axis D1, and parallel to the pivot axis D.

More particularly, the transverse strips or rods of the longitudinal translation platform 31 extend over at least two mutually parallel levels, each level being perpendicular to the pivot axis D.

More particularly, the arrangement of the transverse strips or rods of the longitudinal translation platform 31 is identical on each of the levels.

More particularly, the longitudinal strips or rectilinear flexible rods 310 are flat strips whose height is at least five times greater than their thickness.

In a variant, not shown in the figures, the longitudinal strips or rectilinear flexible rods 310 are rods of square or circular section, whose height is equal to the thickness.

Figure 2:
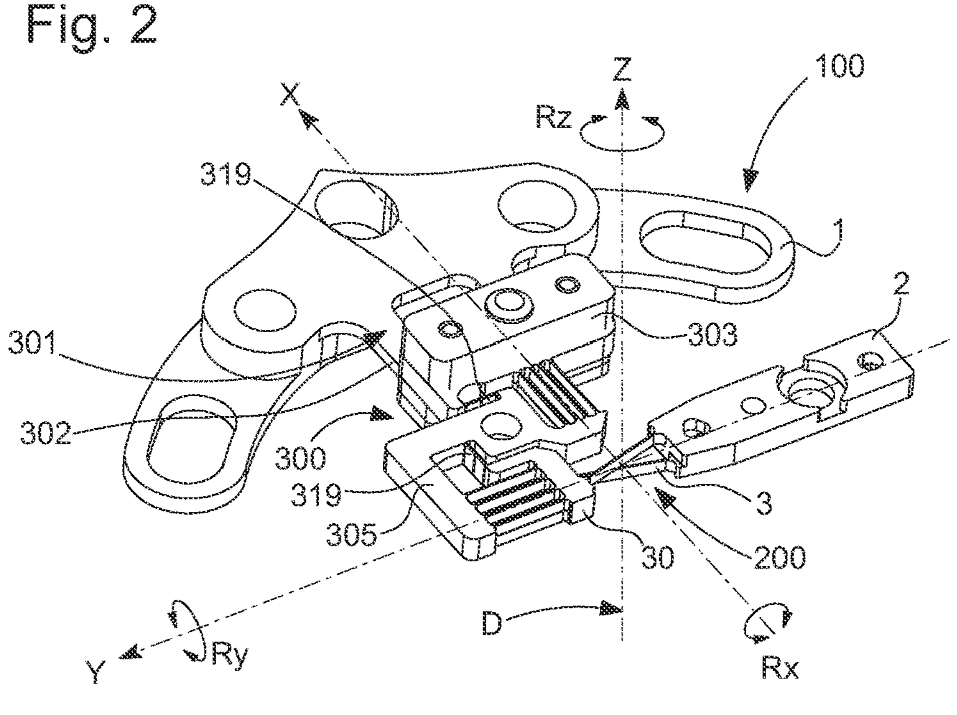
FIG. 2 shows, schematically, and in perspective, a mechanism with the various degrees of freedom of the inertial mass included in the resonator mechanism of FIG. 1; the balance is removed to make the flexible guide with the two elastic strips crossed in projections, as well as the two translation platforms visible.
Figure 3:
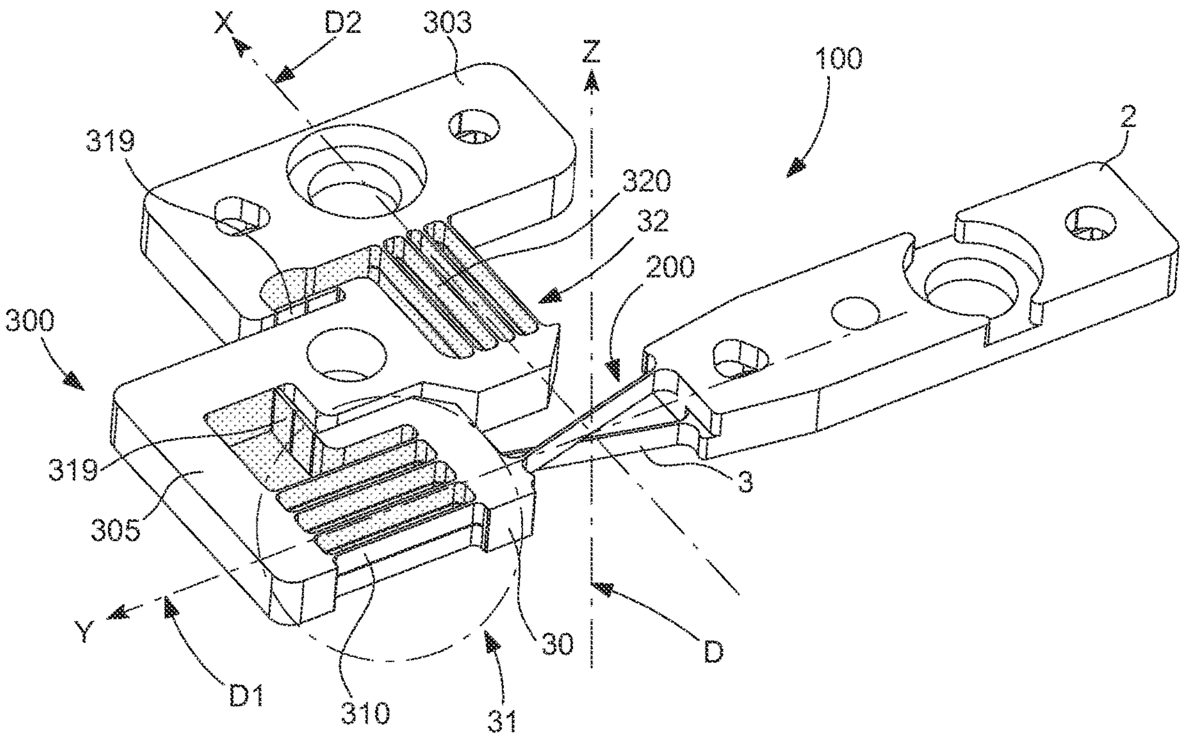
FIG. 3 shows, similarly to FIG. 2, the same mechanism after removal of the elements for connection to a fixed structure of the watch.
Figure 4:
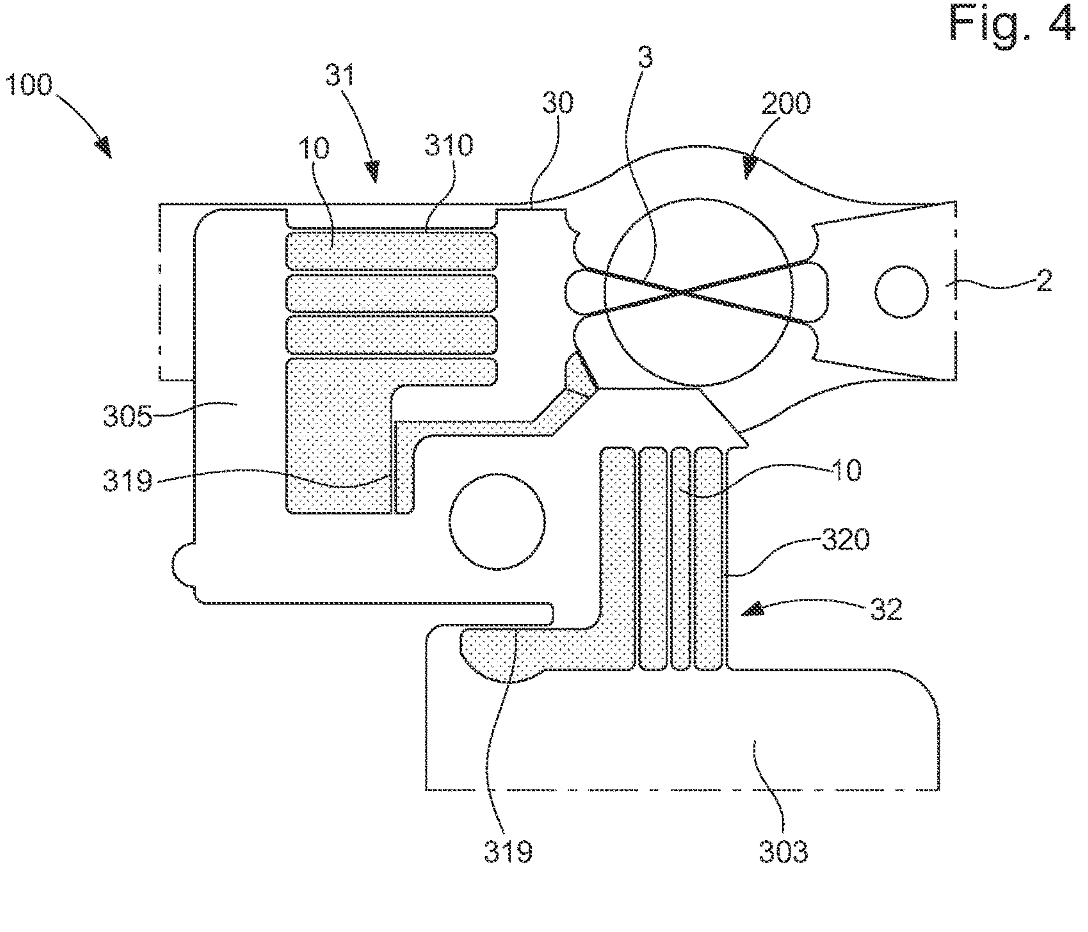
FIG. 4 shows, similarly to FIG. 3, schematically, and from above, the same mechanism.

According to the invention the flexible suspension 300 includes a viscous substance 10 which can be arranged on one or more parts of the flexible suspension 300. As shown in FIGS. 2 and 3, the viscous substance 10 is preferably arranged between the transverse flexible strips or rods 320 of the transverse translation platform 32. The viscous substance 10 allows to absorb the energy due to shocks, in particular in order to prevent the transverse strips or rods 320 from breaking or cracking. The viscous substance 10 can also act as a protection for the other parts of the flexible suspension.

The viscous substance 10 is also arranged between the flexible strips or rods 310 of the longitudinal translation platform 31.

Preferably, the viscous substance 10 at least partially fills the space between the flexible strips or rods. Thus, it forms a continuum of material connecting the flexible strips or rods to each other in the space which laterally separate them.

In an alternative embodiment, the viscous substance 10 is arranged at least partly around the first intermediate mass 303. The viscous substance is preferably also arranged at least partly around the second intermediate mass 305. The viscous substance 10 is for example arranged at least partly around said anchoring block 30.

In another variant embodiment, the viscous substance is arranged between the transverse flexible strips or rods 320 of the transverse translation platform 32, between the flexible strips or rods 310 of the longitudinal translation platform 31, at least partly around the first intermediate mass 303 at least partly around the second intermediate mass 305, and at least partly around said anchoring block 30.

In a first embodiment of the resonator mechanism, the viscous substance 10 comprises silicone, preferably substantially in its entirety. The silicone absorbs the energy of the shock with good efficiency.

According to a second embodiment of the resonator mechanism, the viscous substance 10 comprises glue sensitive to ultraviolet radiation. When initially viscous, such an adhesive hardens under the effect of ultraviolet radiation. For its use according to the invention, the glue is kept in a viscous form, without applying ultraviolet radiation.

The third embodiment of the viscous substance 10 comprises rubber.

Other materials for the viscous substance 10 are of course possible in other embodiments not described above.

A viscous substance means a material strong enough to avoid flowing, but which is easily deformed. Thus, the viscous substance adheres to the walls of the flexible suspension 300, and remains in place. When the flexible suspension 300 is moving, the viscous substance deforms and provides resistance that dissipates energy, in particular when the movement is great, especially in the event of a shock.

In particular, the resonator mechanism 100 includes axial stop means including at least a first axial stop 7 and a second axial stop 8 to limit the travel in translation of the inertial element 2 at least in the first direction Z, the axial stop means being arranged to bearingly cooperate with the inertial element 2 for the protection of the longitudinal strips 3 at least against axial shocks in the first direction Z, and the second plane of symmetry is substantially at an equal distance from the first axial stop 7 and the second axial stop 8.

In a particular variant, the resonator mechanism 100 includes a plate 301, including at least one flexible strip 302 extending in a plane perpendicular to the pivot axis D, and fixed to the structure 1 and to the first intermediate mass 303, and which is arranged to allow mobility of the first intermediate mass 303 in the first direction Z. More particularly, the plate 301 includes at least two coplanar flexible strips 302. Such a plate 301 is however optional if the height of the strips of the translation platforms XY is low compared to the height of the flexible strips 3, in particular less than a third of the height of the flexible strips 3.

In a particular variant, the flexible suspension 300 is made in one piece, preferably of silicon.

In an advantageous embodiment, the resonator mechanism 100 includes a one-piece assembly, which includes at least the anchoring block 30, a base of the at least one inertial element 2, the flexible pivot 200, the flexible suspension 300, the first intermediate mass 303, and the transverse translation platform 32, and includes at least one breakable element 319 arranged to secure the components of the one-piece assembly during their assembly on the structure 1, and the rupture of which releases all the movable components from the one-piece assembly.

More particularly, the one-piece assembly further includes at least the second intermediate mass 305 and the longitudinal translation platform 31.

As discussed above, the manufacturing technology used allows to obtain two distinct strips in the height of a silicon wafer, which promotes the torsional flexibility of the platform without making it more flexible for translation. And the resonator mechanism 100 can thus advantageously include at least two superimposed elementary one-piece assemblies, each of which includes a level of the anchoring block 30, and/or of a base of the at least one inertial element 2, and/or of the flexible pivot 200, and/or of the flexible suspension 300, and/or of the first intermediate mass 303, and/or of the transverse translation platform 32, and/or of a breakable element 319; each elementary one-piece assembly can be assembled with at least one other elementary one-piece assembly by bonding or the like, by mechanical assembly, or by growth of $SiO_2$ in the case of an embodiment of silicon, or the like.

More particularly, such an elementary one-piece assembly further includes at least one level of the second intermediate mass 305 and/or of the longitudinal translation platform 31.

The invention also relates to a timepiece oscillator mechanism including such a timepiece resonator mechanism 100, and an escapement mechanism, arranged to cooperate with one another.

The invention also relates to a horological movement including at least one such oscillator mechanism and/or at least one resonator mechanism 100.

The invention claimed is:

1. A timepiece resonator mechanism (100), comprising:

a structure (1);

an anchoring block (30) from which is suspended at least one inertial element (2) arranged to oscillate according to a first rotational degree of freedom RZ about a pivot axis (D) extending in a first direction Z, said inertial element (2) being subjected to return forces exerted by a flexible pivot (200) including a plurality of substantially longitudinal elastic strips (3), each fixed, at a first end to said anchoring block (30), and at a second end to said inertial element (2), each said elastic strip (3) being deformable essentially in a plane XY perpendicular to said first direction Z, said anchoring block (30) being suspended from said structure (1) by a flexible suspension (300) arranged to allow mobility of said anchoring block (30); and a viscous substance (10) arranged at least partly around the flexible suspension (300), the viscous substance (10) being configured to at least partly dissipate the energy due to a shock.

2. The resonator mechanism (100) according to claim 1, wherein said flexible suspension (300) includes, between said anchoring block (30) and a first intermediate mass (303), which is fixed to said structure (1) directly or by means of a flexible plate (301) in said first direction Z, a transverse translation platform (32) including at least two transverse flexible strips or rods (320), which are rectilinear, and extending in said second direction X and in symmetry about a transverse axis (D2) crossing said pivot axis (D).

3. The resonator mechanism (100) according to claim 2, wherein the viscous substance (10) is arranged between the transverse flexible strips or rods of the transverse translation platform (32).

4. The resonator mechanism (100) according to claim 2, wherein the viscous substance (10) is arranged at least partly around the first intermediate mass (303).

5. The resonator mechanism (100) according to claim 1, wherein the viscous substance (10) is arranged at least partly around said anchoring block (30).

6. The resonator mechanism (100) according to claim 1, wherein the viscous substance (10) comprises silicone.

7. The resonator mechanism (100) according to claim 1, wherein the viscous substance (10) comprises glue sensitive to ultraviolet radiation.

8. The resonator mechanism (100) according to claim 1, wherein the viscous substance (10) comprises rubber.

9. The resonator mechanism (100) according to claim 1, wherein said flexible suspension (300) includes, between said anchoring block (30) and a second intermediate mass (305), a longitudinal translation platform (31) including at least two longitudinal flexible strips or rods (310), which are rectilinear, and extending in a third direction Y and in symmetry about a longitudinal axis (D1) crossing said pivot axis (D), and includes said transverse translation platform (32) between said second intermediate mass (305) and said first intermediate mass (303).

10. The resonator mechanism (100) according to claim 9, wherein the viscous substance (10) is arranged at least partly between the flexible strips or rods (310) of the longitudinal translation platform (31).

11. The resonator mechanism (100) according to claim 10, wherein the viscous substance (10) is arranged at least partly around the second intermediate mass (305).

12. The resonator mechanism (100) according to claim 1, wherein the flexible suspension (300) is made in one piece.

13. The resonator mechanism (100) according to claim 1, wherein the flexible suspension (300) is made of silicon.

14. The resonator mechanism (100) according to claim 2, wherein said anchoring block (30) is movable according to five flexible degrees of freedom of the suspension which are a first translational degree of freedom along said first direction Z, a second translational degree of freedom along a second direction X orthogonal to said first direction Z, a third translational degree of freedom along a third direction Y orthogonal to said second direction X and to said first direction Z, a second rotational degree of freedom RX about an axis extending in said second direction X, and a third rotational degree of freedom RY about an axis extending in said third direction Y.

15. A horological movement including at least one resonator mechanism (100) according to claim 1, and an escapement mechanism, which are arranged to cooperate with each other.

* * * * *